(12) United States Patent
Hu et al.

(10) Patent No.: US 9,762,516 B2
(45) Date of Patent: Sep. 12, 2017

(54) VARIABLE IMAGE ACQUISITION AND PROCESSING TECHNIQUES BASED ON IMAGE DATA TYPE

(71) Applicant: Cellco Partnership, Arlington, VA (US)

(72) Inventors: Dongliang Hu, Dublin, CA (US); Zhijian Lin, Dublin, CA (US); Brandon James Martella, Brentwood, CA (US)

(73) Assignee: Cellco Partnership, Basking Ridge, NJ (US)

( * ) Notice: Subject to any disclaimer, the term of this patent is extended or adjusted under 35 U.S.C. 154(b) by 276 days.

(21) Appl. No.: 14/260,111

(22) Filed: Apr. 23, 2014

(65) Prior Publication Data

US 2015/0312183 A1    Oct. 29, 2015

(51) Int. Cl.
| | |
|---|---|
| *G06F 3/048* | (2013.01) |
| *H04L 12/58* | (2006.01) |
| *H04L 29/08* | (2006.01) |
| *H04W 4/12* | (2009.01) |
| *H04W 4/18* | (2009.01) |

(52) U.S. Cl.
CPC ............ *H04L 51/08* (2013.01); *H04L 67/02* (2013.01); *H04L 67/06* (2013.01); *H04L 67/2823* (2013.01); *H04W 4/12* (2013.01); *H04W 4/18* (2013.01)

(58) Field of Classification Search
None
See application file for complete search history.

(56) References Cited

U.S. PATENT DOCUMENTS

| | | | |
|---|---|---|---|
| 8,365,081 B1* | 1/2013 | Amacker | G06Q 10/10 |
| | | | 705/27.1 |
| 9,477,669 B2* | 10/2016 | Pylappan | G06F 17/30058 |
| 2004/0183830 A1* | 9/2004 | Cody | G06Q 10/107 |
| | | | 715/747 |
| 2008/0072157 A1* | 3/2008 | Pally | G06F 17/30899 |
| | | | 715/738 |
| 2009/0172565 A1* | 7/2009 | Jackson | H04L 67/1095 |
| | | | 715/753 |
| 2011/0010688 A1* | 1/2011 | Hogg | G06F 8/34 |
| | | | 717/105 |
| 2013/0024795 A1* | 1/2013 | Robotham | G06F 3/0486 |
| | | | 715/769 |

(Continued)

OTHER PUBLICATIONS

L. Masinter, "The 'Data' URL Scheme," Network Working Group Request for Comments 2397, Aug. 1998 (available at http://www.ietf.org/rfc/rfc2397.txt <athttp://www.ietf.org/rfc/rfc2397.txt>, visited Apr. 23, 2014).

*Primary Examiner* — Hua Lu

(57) ABSTRACT

A server device may receive file data from a user device via a web browser application associated with the user device. The file data may be extracted by an application, different from the web browser application, associated with the user device. The server device may determine an acquisition technique based on the file data; obtain a computer file, associated with the file data, using the acquisition technique; receive, from the user device, a request to transmit a message including the computer file; insert the computer file in the message; and transmit the message.

20 Claims, 8 Drawing Sheets

(56) References Cited

U.S. PATENT DOCUMENTS

2015/0061972 A1* 3/2015 Seo ............. G06F 3/0488
 345/2.3
2015/0121202 A1* 4/2015 Saund ........... G06F 17/211
 715/249

* cited by examiner

400 ⟶

| Image Acqusition Parameters | Acqusition Technique |
|---|---|
| URL | Request image from source device using URL |
| Embedded image source data (scheme 1 coding) | Decode image using decoding scheme 1 |
| Embedded image source data (scheme 2 coding) | Decode image using decoding scheme 2 |
| File API data | Instruct user device to process and provide image |
| Binary computer file | Instruct user device to process and provide image |

| Criteria | Processing Rule |
|---|---|
| Sender = sender1@mail.com<br>Recipient = recipient1@mail.com | Convert to .jpg<br>Compress to 480x640 |
| Sender = sender1@mail.com<br>Recipient type = telelphone number | Convert to .jpg<br>Compress to 240x320 |
| Recipient carrier network ID = Carrier A | Compress to 240x320 |
| Sender = sender1@mail.com<br>Recipient = recipient1@mail.com<br>Image classification = Animals | Enhance using Filter 1 |
| Sender = sender1@mail.com<br>Recipient = recipient1@mail.com<br>Image classification = Nature | Enhance using Filter 2 |

Fig. 4B

VARIABLE IMAGE ACQUISITION AND PROCESSING TECHNIQUES BASED ON IMAGE DATA TYPE

BACKGROUND

Users sometimes employ user devices to e-mail image files to other users. One technique for a user to obtain an image for e-mailing is to "drag and drop" the image from a webpage to a web-based messaging client. When dragging an image from a webpage (to be subsequently dropped into the messaging client), different web browser applications may extract different image data. For example, one browser application may extract a universal resource locator (URL) associated with the image, whereas another browser application may extract embedded image data for images embedded directly on a webpage. When dragging and dropping an image from a computer file system, the computer file system may extract a binary computer file corresponding to the image.

When attaching an image file, presented on a webpage in a first browser application, to a message (e.g., an e-mail message, a multimedia service (MMS) message, etc.) via a messaging web client presented on a second browser application, the user may not be able to simply drag the image from the webpage to the messaging web client since the image data extracted from the first browser may not be compatible with the second browser.

BRIEF DESCRIPTION OF THE DRAWINGS

FIG. 4A illustrates an example data structure for storing rules that identify particular techniques for obtaining an image;

FIG. 4B illustrates an example data structure for storing rules that identify processing rules based on a set of criteria;

DETAILED DESCRIPTION OF THE PREFERRED EMBODIMENTS

The following detailed description refers to the accompanying drawings. The same reference numbers in different drawings may identify the same or similar elements.

A user device may access an image using different applications (e.g., different web browser applications, image viewing applications, file browser applications, etc.). When dragging and dropping an image file from one location to another (e.g., in the context of dragging and dropping the image from a webpage into a messaging client to attach the image to a message), different applications (e.g., different web browser applications) may extract different image data, associated with the image file, having different information. For example, one application may extract image data that includes a URL identifying a location of the image. Another application may extract image data that includes embedded image source data representative of the image. Another application may extract image data that has some other information that may be used to obtain the image.

Systems and/or methods, as described herein, may obtain images using different techniques based on different image data extracted by different applications. For example, when image data, associated with an image, is extracted by a first application, the systems and/or methods may obtain the image using a first technique. When image data is extracted by a second application, the systems and/or methods may obtain the image using a second technique.

Once an image is obtained, the systems and/or methods may process the image using different processing rules that are based on image attributes and/or information regarding a sender and/or recipient of the image. In some implementations, an image may be obtained (e.g., for attaching into an e-mail message or some other type of message) when the image is dragged and dropped from a particular application to a messaging client presented in a different application (e.g., a different web browser application).

Figure 1:
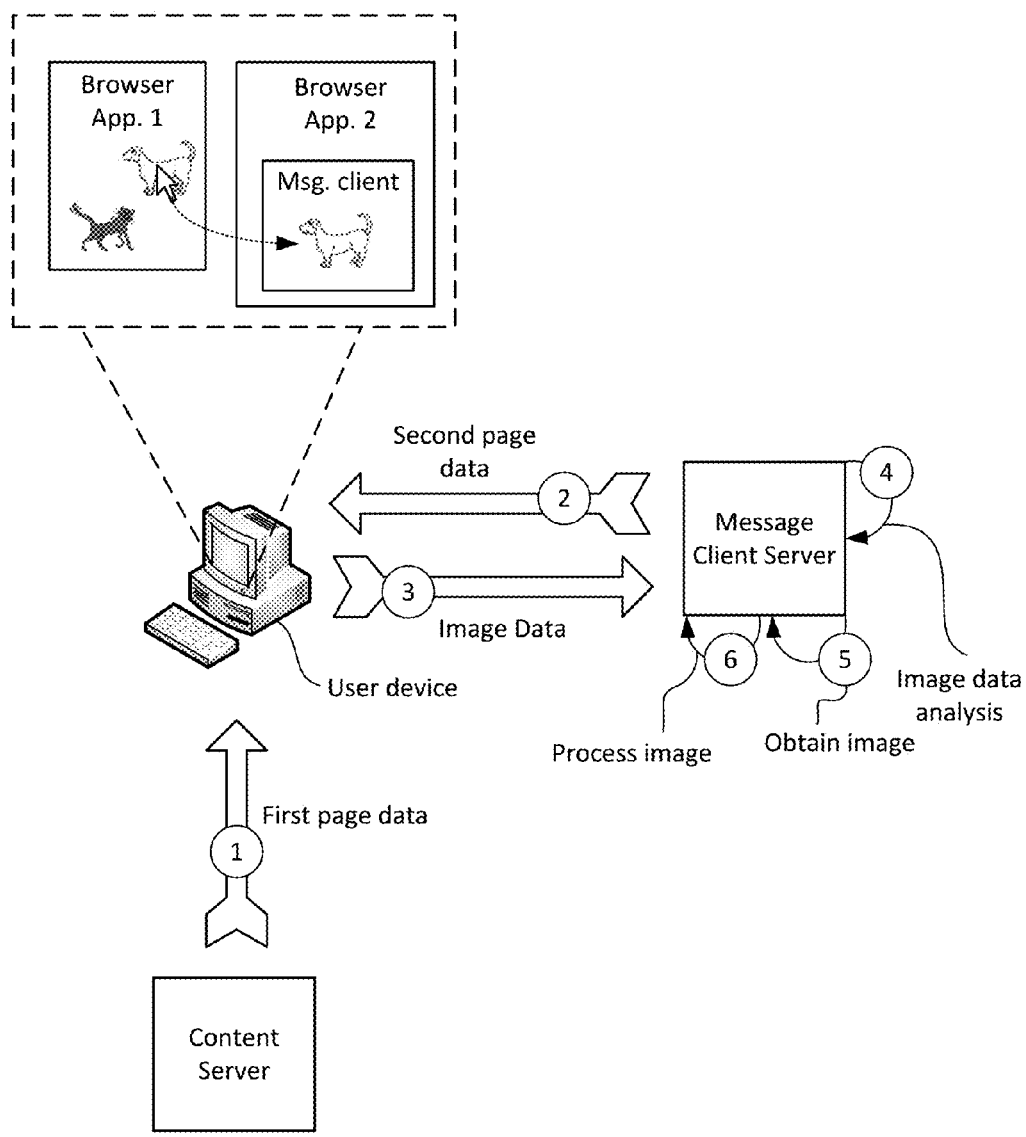
FIG. 1 illustrates an example overview of an implementation described herein.

FIG. 1 illustrates an example overview of an implementation described herein. As shown in FIG. 1 a user device may access a first webpage (herein after referred to as a "page") associated with a content server. Further, the user device may access a messaging client via a second page associated with a message client server. The messaging client may be accessed to permit the user to attach an image and/or other computer file to a message, and to send the message to a recipient. In FIG. 1, assume that the user device accesses the first page via a first web browser application (hereinafter referred to as a "browser application"), and the second page via a second browser application (a browser application that is different than the first browser application).

In FIG. 1, the content server may provide data associated with the first page (arrow 1) when the user device accesses the first page, and the message client server may provide data associated with the second page when the user device access the second page (arrow 2). The data may include images from the first page and may be presented in the first browser application. As shown in FIG. 1, a user may drag and drop one of the images from the first browser application to the message client presented via the second browser application. When the image is dragged from the first browser application and dropped into the message client in the second browser application, the first browser application may extract image data associated with the image. Further, the message client may receive the image data, and provide the image data to the message client server (arrow 3). The message client server may then analyze the image data (arrow 4) to determine how the image may be obtained. For example, the message client server may analyze the image data to identify parameters that may be used to obtain the image, such as a URL included in the image data, a local file path of the image, embedded image source data, and/or some other information that may be used, by the message client server, to obtain the image. Using the parameters, the message client server may obtain the image (arrow 5).

As described above, different applications may extract different image data when the image is dragged and dropped. The message client server may obtain the image using different techniques when different image data is extracted by different applications. As a result, the image may be obtained by the message client server when a variety of image data is provided by the user device (e.g., when different applications are used to drag and drop an image to the messaging client).

Once the image is obtained, the message client server may process the image (arrow 6). When processing the image, for example, the message client server may convert the image from one file type to another file type, reduce the resolution of the image, enhance the image, and/or process the image in some other manner. Once the image is processed, the message client server may store the processed image. The message client server may receive an instruction to provide the image (e.g., from the user device via the message client), and may transmit the image without needing to re-process the image upon receiving the instruction to provide the image. As a result, an image may be obtained and attached to a message when the image is dragged from one browser application to a message client running on a different browser application. Further, an image may be obtained based on a variety of image data provided by different applications. As described in greater detail below, the user device may process the image, for example, so that the message client server may not need to process the image, thereby reducing costs associated with processing the image by the message client server.

While the systems and/or methods, described herein, are described in terms of obtaining images based on various image data, in practice, the systems and/or methods are not so limited. For example, the systems and/or methods may be used to obtain some other type of computer resource, referred to as a computer file herein. As an example, a first application may obtain file data, associated with a computer file, when the computer file (or a representation of the computer file) is dragged and dropped from the first application to a messaging client presented in a second application. The file data may include the substantive contents of the computer file and/or meta data relating to the computer file (e.g., a link to the computer file, encoding information relating to the computer file, or other information relating to a location and/or format of the computer file). The messaging client server may receive the file data, and based on the file data, obtain the computer file. The file data may be associated with any type of computer file, such as an image file, an audio file, a video file, etc.

Figure 2:
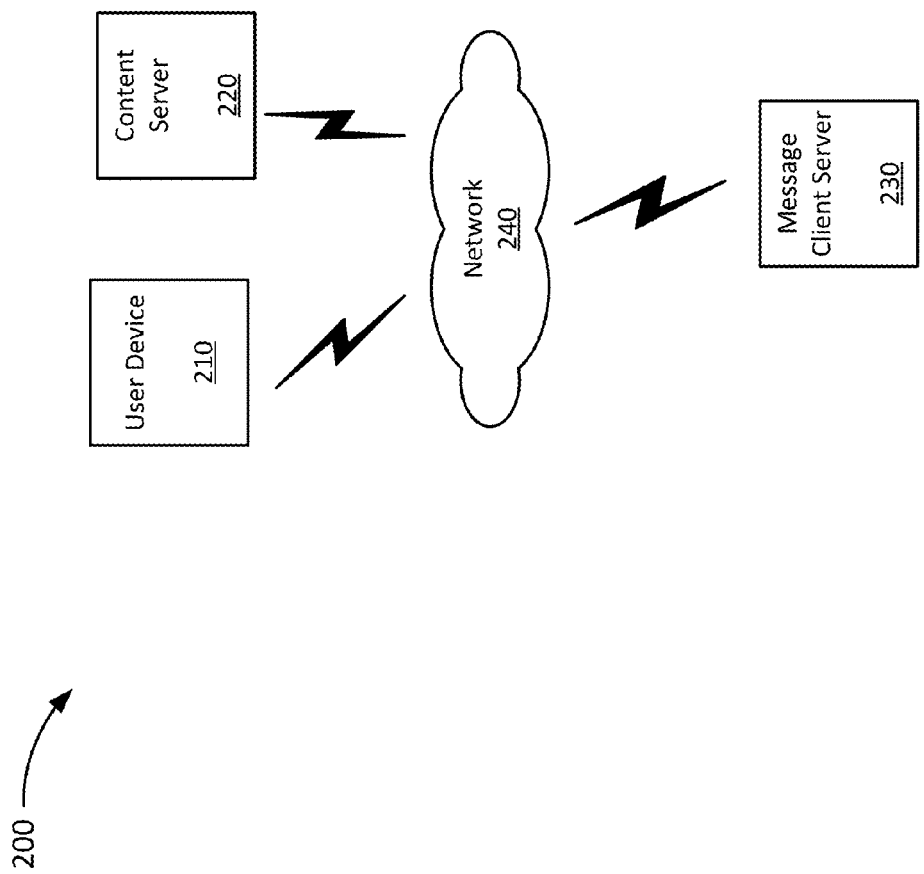
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210, content server 220, message client server 230, and network 240.

User device 210 may include a device capable of communicating via a network, such as network 240. For example, user device 210 may correspond to a desktop computing device, a mobile communication device (e.g., a smart phone or a personal digital assistant (PDA)), a portable computer device (e.g., a laptop or a tablet computer), or the like. User device 210 may communicate with content server 220 to receive content, for example, via a web page associated with content server 220. User device 210 may communicate with message client server 230 to access a web-based messaging client to attach an image and/or other computer file to a message, and to provide the message to a recipient. User device 210 may provide message client server 230 with image data (e.g., when an image is dragged and dropped from an application to the web-based messaging client).

Content server 220 may include one or more computing devices, such as a server device or a collection of server devices. In some implementations, content server 220 may host a web page that may include content, such as one or more images. In some implementations, an image may be embedded on a web page as in-line content of data following a URI scheme (e.g., the request for comments (RFC) 2397 scheme, or the like).

Message client server 230 may include one or more computing devices, such as a server device or a collection of server devices. In some implementations, message client server 230 may provide a web-based e-mail service that user device 210 may access, for example, via a messaging client. Message client server 230 may receive image data from user device 210, and may obtain an image corresponding to the image data. For example, message client server 230 may analyze the image data to identify image acquisition parameters (e.g., parameters that may be used to obtain the image). Message client server 230 may also process the image based on a set of processing rules that identify processing parameters based on attributes of the image and/or attributes of a sender and/or recipient of the image.

Network 240 may include one or more wired and/or wireless networks. For example, network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 240 may include a local area network (LAN), a wide area network (WAN), a metropolitan network (MAN), the Public Switched Telephone Network (PSTN), an ad hoc network, a managed Internet Protocol (IP network, a virtual private network (VPN), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
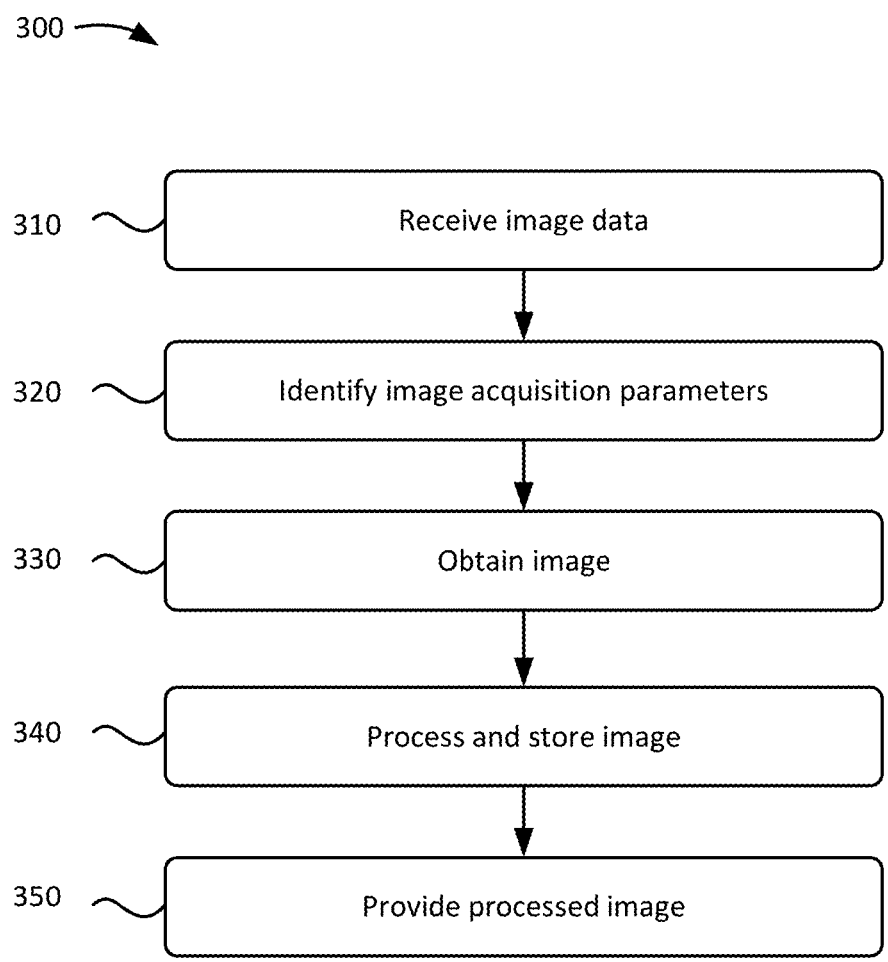
FIG. 3 illustrates a flowchart of an example process for obtaining an image using a particular image acquisition technique.

FIG. 3 illustrates a flowchart of an example process 300 for obtaining an image using a particular image acquisition technique. In some implementations, process 300 may be performed by message client server 230. In some implementations, some or all of blocks of process 300 may be performed by other devices in environment 200 (e.g., user device 210 and/or content server 220), in addition to, or in lieu of, message client server 230.

As shown in FIG. 3, process 300 may include receiving image data (block 310). For example, message client server 230 may receive image data from user device 210. In some implementations, the image data may not be an actual image file, but may include information representative of an image file. For example, the image data may include a URL identifying a path where the image is located, a local file path of the image, embedded image source data, and/or some other information that may be used, by the message client server, to obtain the image. Additionally, or alternatively, the image data may be a binary computer file associated with the image.

As described above, a messaging client may provide the image data to message client server 230 when a user drags and drops an image from a source location to the messaging client. For example, user device 210 may provide the image data when a user drag and drops the image from an application (e.g., a web browser application, a file browser application, an image viewing application, etc.) to the messaging client. In some implementations, the message client may provide the image data when the image is dragged and dropped from an application to a different application associated with the messaging client.

Process 300 may also include identifying image acquisition parameters (block 320). For example, message client server 230 may identify the image acquisition parameters (e.g., parameters that may be used to obtain the image) based on the received image data. In some implementations, message client server 230 may analyze the image data to determine a particular format, of one or more predetermined formats, corresponding to the image data. (e.g., based on a look-up table that identifies the predetermined formats). Message client server 230 may also identify the browser application, associated with the message client, and identify a format of the image data based on the browser application.

In some implementations, message client server 230 may identify a parameter, such as a URL associated with the image, a local file path associated with the image, embedded image source data representative of the image, a binary computer file, and/or some other information that may be used to obtain the image. For example, message client server 230 may identify a URL and/or embedded image source data when the image was dragged and dropped from a web page associated with content server 220 to the messaging client. Message client server 230 may identify a local file path and/or a binary computer file when the image was dragged and dropped from a local storage medium of user device 210 to the messaging client.

In some implementations, message client server 230 may identify the image acquisition parameters based on a format of the image data. For example, message client server 230 may implement filters that may identify a URL or other type of file path. Additionally, or alternatively, message client server 230 may implement a filter that identifies embedded image source data (e.g., based on a URI scheme, such as the RFC 2397 scheme, or the like). Additionally, or alternatively, message client server 230 may identify an image acquisition parameter based on some other technique.

Process 300 may further include obtaining the image (block 330). For example, message client server 230 may obtain the image based on the image data and the image acquisition parameters. In some implementations, message client server 230 may obtain the image using a particular technique based on the image acquisition parameters. For example, message client server 230 may obtain the image using one technique when the image acquisition parameters include a URL. Additionally, or alternatively, message client server 230 may obtain the image using a different technique when the image acquisition parameters include some other information (e.g., embedded image source data). As an example (e.g., when the image acquisition parameters include a URL), message client server 230 may request the image from content server 220 using the URL, and may receive the image from content server 220. As another example (e.g., when the image acquisition parameters include embedded image source data), message client server 230 may decode the embedded image source data based on a decoding algorithm associated with a URI scheme of the embedded image source data. As another example (e.g., when the image acquisition parameters include a binary computer file representative of the image), message client server 230 may decode the binary computer file to obtain the image. Some additional examples of obtaining the image using a particular technique are described below with respect to FIG. 4A.

Process 300 may also include processing and storing the image (block 340). For example, message client server 230 may process the obtained image. Message client server 230 may also store the processed image. In some implementations, message client server 230 may process the image to convert the image from one file type to another file type, reduce the resolution of the image, enhance the image, and/or process the image in some other manner. Message client server 230 may process the image different based on particular criteria. For example, when one set of criteria are met, message client server 230 may process the image differently than when another set of criteria are met. Message client server 230 may store processing rules that indicate how message client server 230 should process the image when particular criteria are met. As an example, message client server 230 may compress the image to a particular resolution when information identifying a recipient includes a telephone number (e.g., to reduce network load associated with transmitting the message to the recipient via a cellular network).

In some implementations, criteria identified in the processing rules may include attributes of the image, information regarding a user of user device 210 and/or a recipient of the image, and/or some other criteria. Message client server 230 may identify attributes of the image once the image is obtained. For example, message client server 230 may identify a size of the image, a resolution of the image, metadata included in the image, etc. In some implementations, message client server 230 may identify content included in the image using pixel-based classification techniques.

Message client server 230 may receive information identifying the user of user device 210 (e.g., an e-mail address, login information, telephone number, etc., used to access the messaging client) when receiving the image data. Also, message client server 230 may receive information identifying a recipient of the image when the user provides information identifying the recipient of the image via the messaging client. Some additional examples of processing rules and criteria are described below with respect to FIG. 4B.

Process 300 may further include providing the processed image (block 350). For example, message client server 230 may provide the processed image based on receiving a request to provide the processed image. In some implementations, the user of user device 210 may provide the request to provide the processed image to a recipient (e.g., via the messaging client). The request may include information regarding the recipient (e.g., an e-mail address of the recipient, a telephone number of the recipient, etc.). Since message client server 230 previously stored the processed image upon obtaining the image when the image was dragged and dropped by the user (e.g., to the messaging client), message client server 230 may not need to process the image when the request to provide the image is received. In some implementations, providing the processed image may include incorporating or inserting the image into a corresponding email that is sent, from the messaging client, from user device 210.

In some implementations, process 300 may correspond to a process for obtaining a computer file using a particular file acquisition technique when message client server 230 receives file data other than image data. For example, as described above the file data may include the substantive contents of the computer file and/or meta data relating to the computer file (e.g., a link to the computer file, encoding information relating to the computer file, or other information relating to a location and/or format of the computer file). Message client server 230 may receive the file data, and based on the file data, obtain the computer file. The file data may be associated with any type of computer file, such as an image file, an audio file, a video file, etc.

FIG. 4A illustrates an example data structure 400 for storing rules that identify particular techniques for obtaining an image. In some implementations, data structure 400 may be stored in a memory of message client server 230. In some implementations, data structure 400 may be stored in a memory separate from, but accessible by, message client server 230 (e.g., a "cloud" storage device). In some implementations, data structure 400 may be stored by some other device in environment 200, such as user device 210 and/or content server 220. A particular instance of data structure 400 may contain different information and/or fields than another instance of data structure 400.

As shown in FIG. 4A, each entry in data structure 400 may store an acquisition technique corresponding to acquisition parameters associated with or determined based on image data received by message client server 230. As an example, data structure 400 may store information to direct message client server 230 to obtain an image from a source device when the image acquisition parameters include a URL. As another example, data structure 400 may store information to direct message client server 230 to obtain an image by decoding embedded image source data when the image acquisition parameters include embedded image source data. In some implementations, data structure 400 may identify a format of coding schemes, and may identify decoding schemes that may be used to decode embedded image source data. As another example, data structure 400 may store information to direct message client server 230 to obtain an image by instructing user device 210 to process and provide a processed image when the image acquisition parameters include a binary computer file (e.g., when a user drags and drops an image file from a file explorer application of user device 210 to a messaging client).

FIG. 4B illustrates an example data structure 450 for storing rules that identify processing rules based on a set of criteria. In some implementations, data structure 450 may be stored in a memory of message client server 230. In some implementations, data structure 450 may be stored in a memory separate from, but accessible by, message client server 230 (e.g., a "cloud" storage device). In some implementations, data structure 450 may be stored by some other device in environment 200, such as user device 210 and/or content server 220. A particular instance of data structure 450 may contain different information and/or fields than another instance of data structure 450.

As shown in FIG. 4B, each entry in data structure 450 may store information identifying how an image should be processed when particular criteria are met. In some implementations, message client server 230 and/or user device 210 may process an image based on information stored by data structure 450. As an example, data structure 450 may identify that an image should be converted to a ".jpg" file and compressed to a 480×640 resolution when message client server 230 receives information identifying a sender having the e-mail address "sender1@mail.com" and a recipient having the e-mail address "recipient1@mail.com." For example, as described above, message client server 230 may receive the information identifying the sender (e.g., a user of user device 210) when user device 210 accesses message client server 230 via a messaging client. Message client server 230 may receive the information identifying the recipient when the user of user device 210 provides the recipient information via the messaging client.

As another example, data structure 450 may identify that when the recipient of the image is identified by a telephone number, the image should be converted to a ".jpg" file and compressed to a 240×320 resolution. In some implementations, the processing rule may be in consideration of multimedia message service (MMS) rules that indicate that messages, provided via a cellular network, are to be compressed in order to reduce network traffic over the cellular network. As another example, data structure 450 may identify that a particular enhancement filter should be used to process an image based on a classification of the image. In some implementations, the classification of the image may be included in the image data (e.g., as header information and/or metadata). Additionally, or alternatively, the classification of the image may be determined based on pixel-based classification techniques.

In some implementations (e.g., when multiple sets of criteria are met), message client server 230 and/or user device 210 may select a particular processing rule to enforce when processing an image using a random selection technique or a round robin selection technique. In some implementations, data structure 450 may store conflict resolution rules and/or priority information for each processing rule that may be used to select a particular processing rule when multiple sets of criteria are met.

While particular fields are shown in a particular format in data structures 400 and 450, in practice, data structures 400 and 450 may include additional fields, fewer fields, different fields, or differently arranged fields than are shown in FIGS. 6A and 6B. Also, FIGS. 6A and 6B illustrate examples of information stored by data structures 400 and 450. In practice, other examples of information stored by data structures 400 and 450 are possible.

Figure 5:
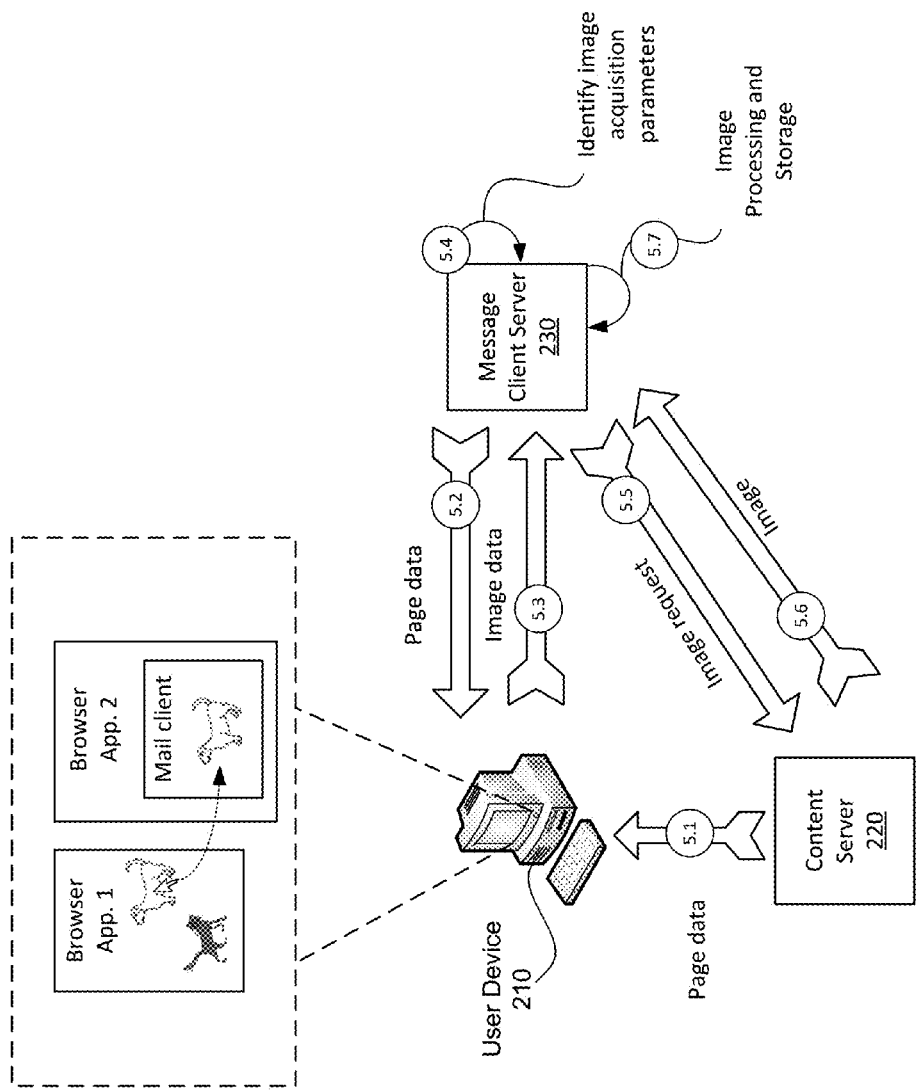
FIGS. 5-7 illustrate example implementations for obtaining an image using a particular image acquisition technique.
Figure 6:
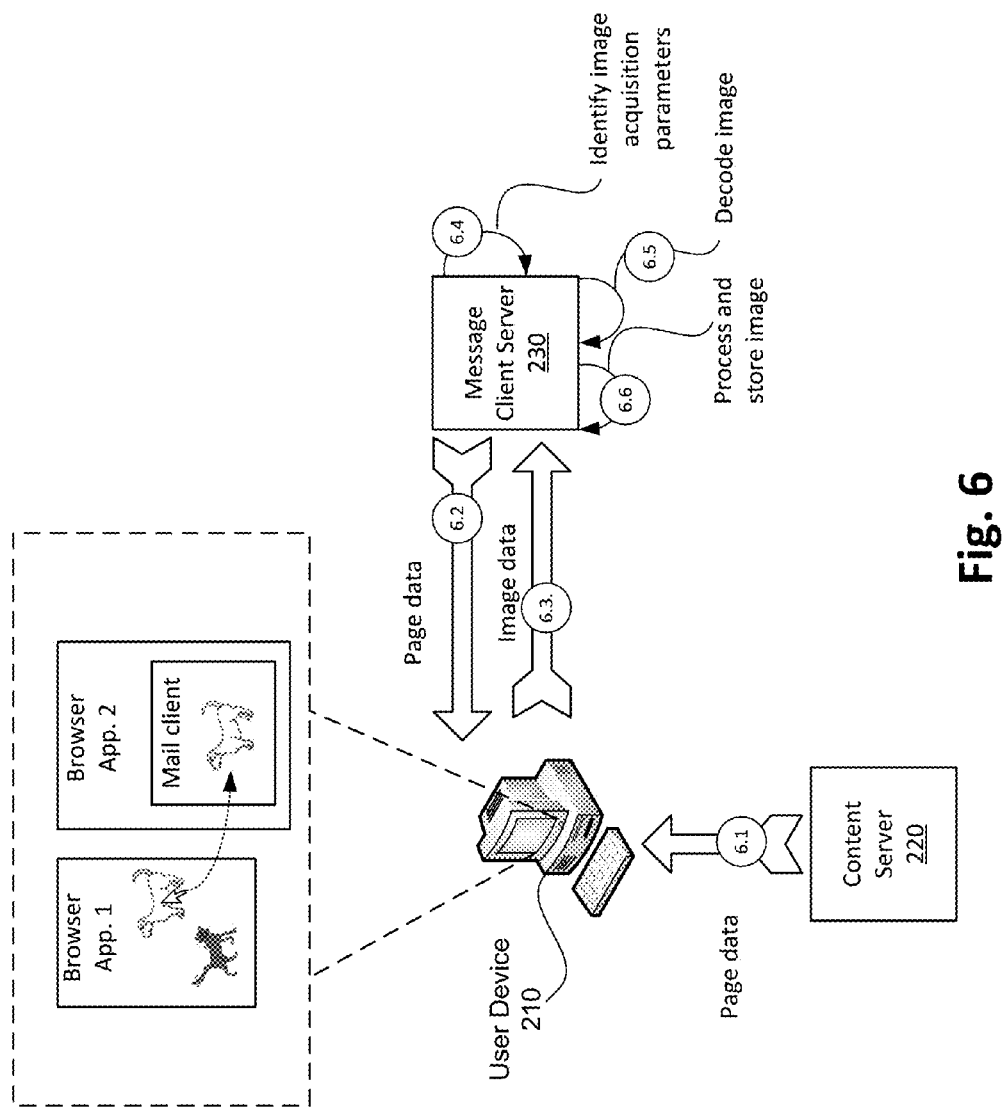
Figure 7:
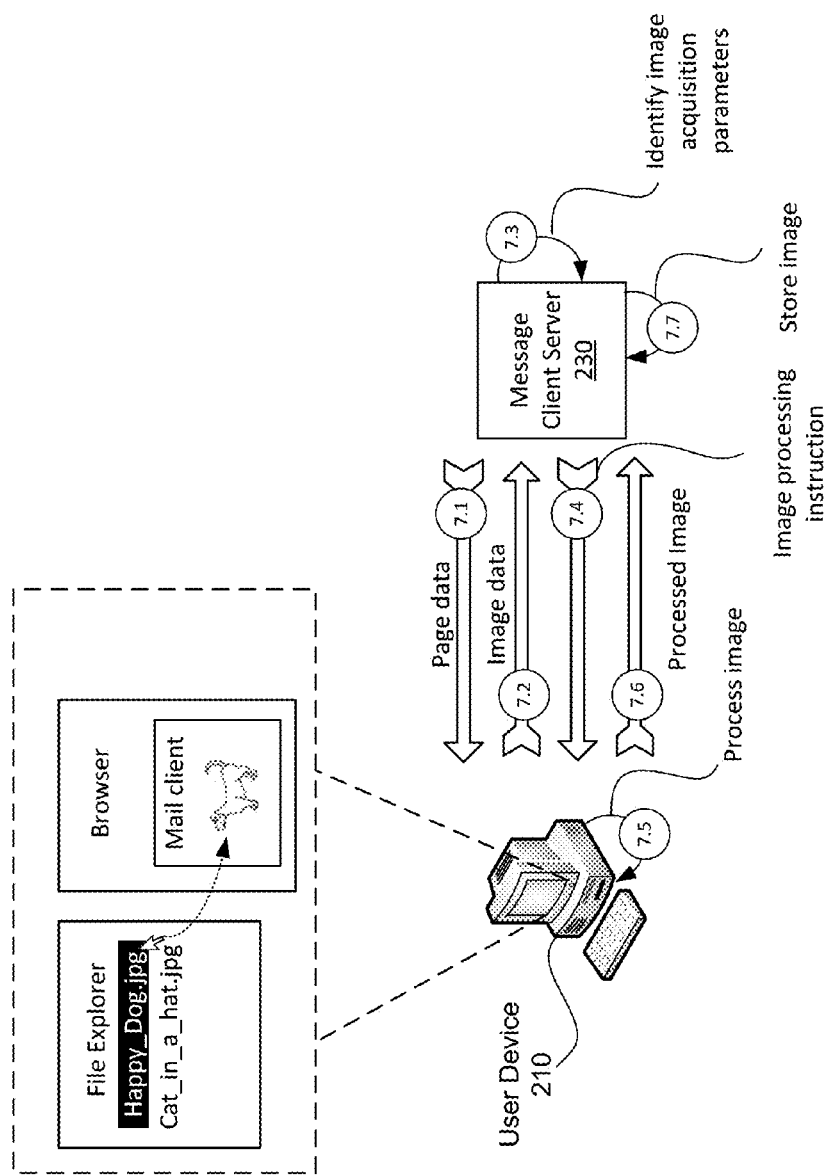

FIGS. 5-7 illustrate example implementations for obtaining an image using a particular image acquisition technique. Referring to FIG. 5, user device 210 may access a page, associated with content server 220, via a first browser application. Content server 220 may provide page data to user device 210 (arrow 5.1), and user device 210 may present the page data in the first browser application. As shown in FIG. 5, the page data may include multiple images. User device 210 may access a messaging client (e.g., a web-based e-mail client) via a second browser application. For example, message client server 230 may provide page data for the messaging client (arrow 5.2). A user of user device 210 may drag an image from the page from the first browser to the messaging client presented in the second browser application. When the user drags the image, the first browser application may extract image data. When the user drops the image into the messaging client, user device 210 may provide the image data to message client server 230 (arrow 5.3).

Upon receiving the image data (e.g., when the user drops the image into the messaging client), message client server 230 may identify image acquisition parameters included in the image data (arrow 5.4). In FIG. 5, assume that message client server 230 identifies a URL associated with the image and that the URL identifies that the image originated from content server 220. Given these assumptions, message client server 230 may provide an image request to content server 220 (arrow 5.5), and content server 220 may provide the image to message client server 230 (arrow 5.6). Message client server 230 process and store the image based on receiving the image (arrow 5.7).

In some implementations, message client server 230 may process the image based on image attributes, information identifying the user of user device 210, and information identifying a recipient of the image. As described above, the information identifying the user, or the information identifying the recipient may identify attributes of a network via which a message, including the image, is transmitted. For example, based on a format of an identifier of the recipient (e.g., an e-mail address, a phone number etc.), the network via which the message is transmitted may be identified. As an example, when the recipient of the message is a telephone number, the message may be converted an MMS message that is transmitted via a network that processes MMS messages. Message client server 230 may process the image in accordance with processing rules associated with this network.

As described above, user device 210 may provide information identifying the user of user device 210 when providing the image data. User device 210 may also provide information identifying the recipient of the image when the user of user device 210 provides the information for the recipient via the messaging client. In some implementations, user device 210 may provide the image data before receiving the recipient information. For example, the user of user device 210 may drag and drop the image to the messaging client before entering in the recipient information via the messaging client. In some implementations, message client server 230 may process the image without receiving the recipient information, and may re-process the image once the recipient information is received. Alternatively, message client server 230 may store an unprocessed version of the image until the recipient information is received. Once the recipient information is received, message client server 230 may process the image, store the processed image, and discard the unprocessed image. As described above, message client server 230 may provide the image when receiving a request to provide the image (e.g., when the request to provide the image is received by user device 210 from the user via the messaging client).

Referring to FIG. 6, content server 220 may provide page data to user device 210 (arrow 6.1), and user device 210 may present the page data in a first browser application. As shown in FIG. 6, the page data may include multiple images. User device 210 may access a messaging client (e.g., a web-based e-mail client) via a second browser application (e.g., based on receiving page data for tshe e-mail client from message client server 230, as shown at arrow 6.2). A user of user device 210 may drag an image from the page from the first browser to the messaging client presented in the second browser application. When the user drags the image, the first browser application may extract image data. When the user drops the image into the messaging client, user device 210 may provide the image data to message client server 230 (arrow 6.3).

Upon receiving the image data (e.g., when the user drops the image into the messaging client), message client server 230 may identify image acquisition parameters associated with the image data (arrow 6.4). In FIG. 6, assume that message client server 230 identifies the image acquisition parameters as embedded image source data. Given this assumption, message client server 230 may decode the embedded image source data to obtain the image (arrow 6.5). Once the image is obtained, message client server 230 may process and store the image (arrow 6.6). For example, as described above, message client server 230 may process and store the image based on image attributes, information identifying the user of user device 210, and/or information identifying a recipient of the image. Message client server 230 may process the image before receiving the recipient information, and re-process the image once the recipient information is received. Alternatively, message client server 230 may store an unprocessed image until the recipient information is received.

Referring to FIG. 7, assume that a user of user device 210 drags and drops an image file from a file explorer application to a web-based messaging client (e.g., an e-mail client). When dragging the image, the file explorer application may extract image data (e.g., a binary file data representative of the image). When the image is dropped into the e-mail client, user device 210 may provide the image data to message client server 230 (arrow 7.2). Upon receiving the image data, message client server 230 may identify image acquisition parameters (arrow 7.3). For example, message client server 230 may identify the binary file data. Based on identifying the binary file data, message client server 230 may provide an instruction to direct user device 210 to process the image (arrow 7.4).

In some implementations, the instruction may include processing parameters that indicate how user device 210 should process the image. The processing parameters may be based on processing rules stored by message client server 230, image attributes, information identifying a user of user device 210, and/or information identifying a recipient of the image. In some implementations, message client server 230 may provide the instruction after receiving information regarding a recipient of the image. Based on receiving the instruction, user device 210 may process the image (arrow 7.5), and provide the processed image to message client server 230 (arrow 7.6). Message client server 230 may store the processed image upon receipt (arrow 7.7). As a result, the image may be processed by user device 210 when the image is stored locally by user device 210, thereby reducing processing by message client server 230.

While particular examples are shown in FIGS. 5-7, the above description is merely an example implementation. In practice, other examples are possible from what is described above in FIGS. 5-7.

Figure 8:
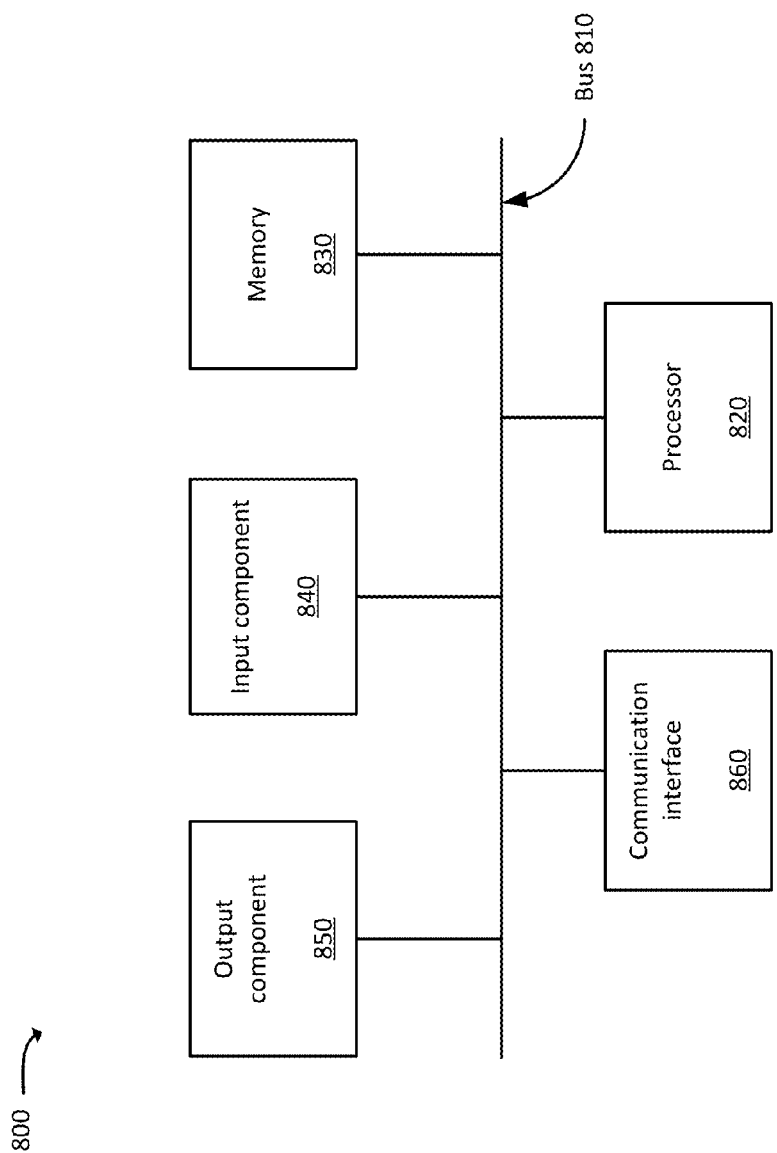
FIG. 8 illustrates example components of one or more devices, according to one or more implementations described herein.

FIG. 8 is a diagram of example components of one or more devices 800, according to one or more implementations described herein. One or more of the devices described above (e.g., with respect to FIGS. 1, 2, and 5-7) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIG. 3, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 2A, 2B, and 3), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:

receiving, by a server device and from a user device, a link to an image associated with a web page, the link being transmitted in response to a drag-and-drop operation on the image, from a web browser application, to a messaging application, and as part of creation of a message with the messaging application, wherein the link is transmitted by the messaging application to the server device and wherein both the web browser application and the messaging application are associated with the user device;

determining, by the server device, an acquisition technique, for acquiring the image, based on the link;

obtaining, by the server device, the image using the acquisition technique;

storing, by the server device, the obtained image;

receiving, by the server device and from the messaging application of the user device, a request to transmit the message, the request being received subsequent to the storing of the image and the request including portions of the message other than the image;

inserting, by the server device and in response to the request, the image that was previously stored, into the message; and transmitting, by the server device, the message, wherein the transmitted message includes the inserted image.

2. The method of claim 1, wherein the link includes a universal resource locator (URL), and wherein obtaining the image includes:
    requesting the image from a source device identified by the URL, and
    receiving the image from the source device.

3. The method of claim 1, wherein the link includes embedded source data, and wherein obtaining the image includes decoding the embedded source data.

4. The method of claim 1, wherein the link references a binary file corresponding to the image, and wherein obtaining the image includes:
    providing an instruction to cause the user device to provide the image to the server device, and
    receiving the provided image.

5. The method of claim 1, further comprising:
    processing the image after obtaining the image,
        the processing including at least one of:
            converting the image from a first file type to a second file type,
            compressing the image, or
            applying an image enhancement filter to the image,
    wherein the storing of the obtained image includes storing the processed version of the image.

6. The method of claim 5, wherein processing the image is based on at least one of:
    attributes of the image,
    information identifying a sender of the message,
    information identifying a recipient of the message, or
    attributes of a network via which the image is transmitted.

7. The method of claim 5, wherein the message includes a multimedia service (MMS) message and the processing of the image includes compressing the image to a size compatible with an MMS message.

8. The method of claim 1, wherein the web browser application is a first web browser application and wherein the messaging application is implemented by a second web browser application.

9. A system comprising:
    a server device, comprising:
        a non-transitory memory device storing:
            a plurality of processor-executable instructions; and
        a processor configured to execute the plurality of processor-executable instructions,
    wherein executing the processor-executable instructions causes the processor to:
        receive, from a user device, a link to an image associated with a web page, the link being transmitted in response to a drag-and-drop operation on the image, from a web browser application, to a messaging application, and as part of creation of a message with the messaging application, wherein the link is transmitted by the messaging application to the server device and wherein both the web browser application and the messaging application are associated with the user device;
        determine an acquisition technique, for acquiring the image, based on the link;
        obtain the image using the acquisition technique;
        store the obtained image;
        receive, from the messaging application of the user device, a request to transmit the message, the request being received subsequent to the storing of the image and the request including portions of the message other than the image;
        insert, in response to the request, the image that was previously stored, into the message; and
        transmit the message, wherein the transmitted message includes the inserted image.

10. The system of claim 9, wherein the link includes a universal resource locator (URL),
    wherein the plurality of processor executable instructions, to obtain the image, further causes the processor to:
        request the image from a source device identified by the URL, and
        receive the image from the source device.

11. The system of claim 9, wherein the link includes embedded source data,
    wherein the plurality of processor executable instructions, to obtain the image, further cause the processor to decode the embedded source data.

12. The system of claim 9, wherein the image includes a binary file corresponding to the image,
    wherein the plurality of processor executable instructions, to obtain the image, further causes the processor to:
        provide an instruction to cause the user device to provide the image to the server device, and
        receive the provided image.

13. The system of claim 9, wherein the processor-executable instructions further causes the processor to:
    process the image after obtaining the image,
        wherein the plurality of processor executable instructions, to process the computer file, further causes the processor to:
            convert the image from a first file type to a second file type,
            compress the image, or
            apply an image enhancement filter to the image,
        wherein the plurality of processor executable instructions further causes the processor to store the image by storing the processed version of the image.

14. The system of claim 13, wherein the plurality of processor executable instructions further causes the processor to:
    process the image based on attributes of the image, information identifying a sender of the message, information identifying a recipient of the message, or attributes of a network via which the image is transmitted.

15. The system of claim 13, wherein the wherein the message includes a multimedia service (MMS) message and wherein the plurality of processor executable instructions further cause the processor to:
    process the image by compressing the image to a size compatible with an MMS message.

16. The system of claim 9, wherein the web browser application is a first web browser application and wherein the messaging application is implemented by a second web browser application.

17. A non-transitory computer-readable medium containing a plurality of processor-executable instructions, that when executed by one or more processors, cause the one or more processors to:
    receive, from a user device, a link to an image associated with a web page, the link being transmitted in response to a drag-and-drop operation on the image, from a web browser application, associated with the user device, to a messaging application, and as part of creation of a message with the messaging application, associated with the user device, wherein the link is transmitted by the messaging application to the server device;
    determine an acquisition technique, for acquiring the image, based on the link;
    obtain the image using the acquisition technique;
    store the obtained image;

receive, from the messaging application of the user device, a request to transmit the message, the request being received subsequent to the storing of the image and the request including portions of the message other than the image;

insert, in the message and in response to the request, the image that was previously stored; and transmit the message, wherein the transmitted message includes the inserted image.

18. The non-transitory computer-readable medium of claim 17, wherein the link includes a universal resource locator (URL), and wherein, in obtaining the image, the plurality of processor-executable instructions are further to cause the one or more processors to:

request the image from a source device identified by the URL, and receive the image from the source device.

19. The non-transitory computer-readable medium of claim 17, wherein the link includes embedded source data, and wherein, in obtaining the image, the plurality of processor-executable instructions are further to cause the one or more processors to:

decode the embedded source data.

20. The non-transitory computer-readable medium of claim 17, wherein the web browser application is a first web browser application and wherein the messaging application is implemented by a second web browser application.

\* \* \* \* \*